United States Patent
Chiu

(10) Patent No.: US 6,532,084 B1
(45) Date of Patent: Mar. 11, 2003

(54) METHOD FOR DETECTING THE RELATIVE LOCATION OF AN IMAGE READING HEAD AND A LIGHT SOURCE

(75) Inventor: Chui-Kuei Chiu, Hsinchu (TW)

(73) Assignee: Umax Data Systems Inc. (TW)

( * ) Notice: Subject to any disclaimer, the term of this patent is extended or adjusted under 35 U.S.C. 154(b) by 0 days.

(21) Appl. No.: 09/358,679

(22) Filed: Jul. 22, 1999

(51) Int. Cl.[7] .................................................. H04N 1/04
(52) U.S. Cl. ........................ 358/475; 358/487; 358/497; 358/486
(58) Field of Search .......................... 358/475, 486.509, 358/497, 474, 471, 406, 504, 505; 399/211; 355/75

(56) References Cited

U.S. PATENT DOCUMENTS 6,034,791 A * 3/2000 Tang et al. .................. 358/475

* cited by examiner

Primary Examiner—Cheukfan Lee
(74) Attorney, Agent, or Firm—Baker Botts LLP

(57) ABSTRACT

The present invention proposes a method for detecting the relative location of an image reading head and a light source, and the method is especially designed for the application in a scanning system for transparent originals. The method in the present invention, for detecting the relative location of an image reading head and a light source in an image reading system, includes several steps as follows. At first, the light source is positioned to a first detecting point in a scanning region of the image reading system. The image reading head is moved to pass through the first detecting point while keeping the light source fixed at the first detecting point. At the same time, the scanned images are recorded through the moving process of the image reading head. Finally, the scanned images is processed to provide functional information of the image reading head and the light source.

16 Claims, 4 Drawing Sheets

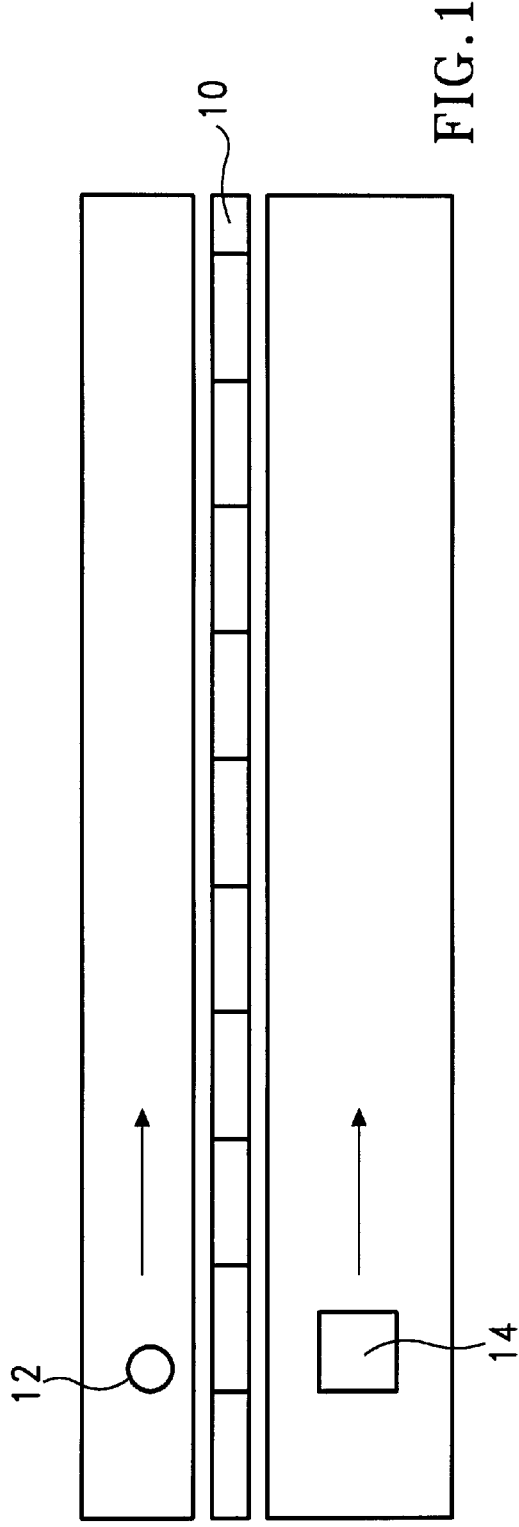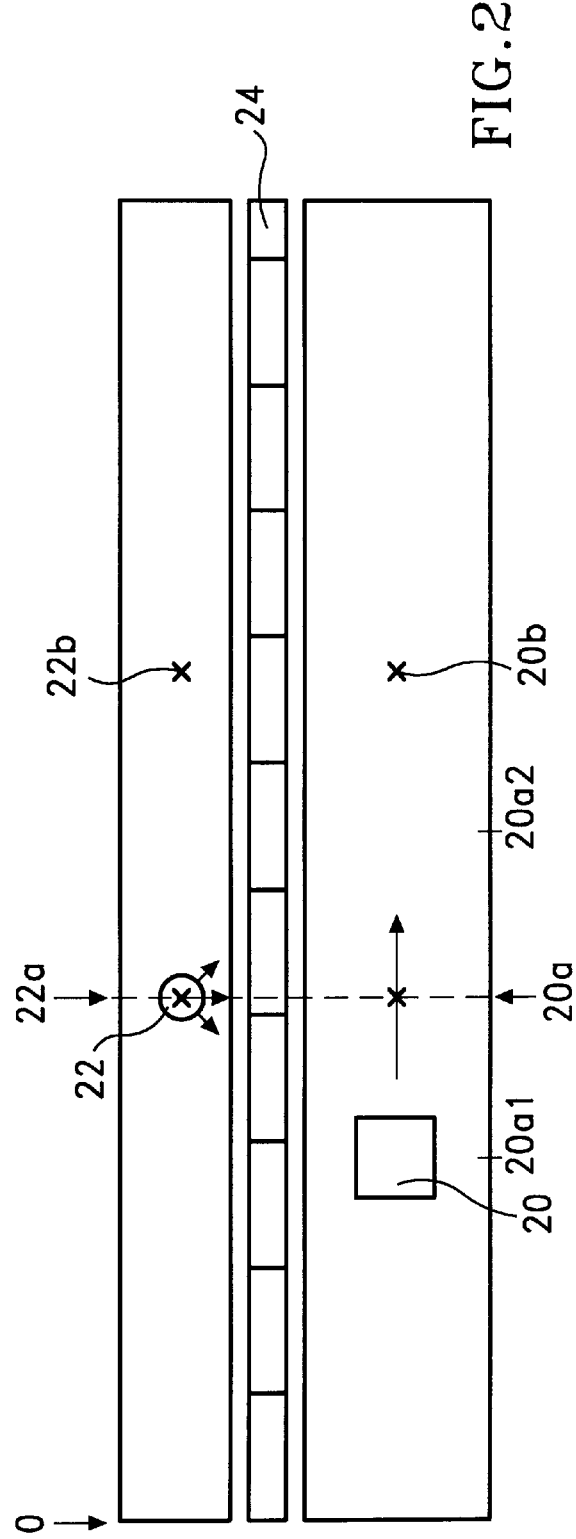

METHOD FOR DETECTING THE RELATIVE LOCATION OF AN IMAGE READING HEAD AND A LIGHT SOURCE

FIELD OF THE INVENTION

The present invention relates to a method for detecting the relative location of an image reading head and a light source, and more specifically, to a method for detecting the relative location of the image reading head and the backside light source for a transparent original, wherein both of the image reading head and the backside light source are driven in an image reading system for transparent originals.

BACKGROUND OF THE INVENTION

The electrical industry has been developed continuously as one of the most important industries in the twentieth century. With the fast progressing in various kinds of computing and processing system, lots of electrical devices including computers, communication devices, and consumer electronics are employed in our daily life. In recent years, the application of image processing apparatus, in combining with the raising processing and storage ability of the computing system or the processors, plays an vital role in image reading, processing, and transferring usage.

Generally, most of the image reading systems can be classified as two categories. The first category is a so-called stationary reading device category. In the first category of image reading systems, the image reading device or image reading head is kept stationary during the document reading process, and the document scanning operation is achieved through moving the originals bypassing the front end of the image reading device or the image reading head. The design is mostly seen on facsimile machines and sheet-feed scanners. The simplified design provides a image reading system with less structural parts and minimize the occupied volume of the whole system.

In contrast to the stationary reading device category, the second category is called as the moving reading device or dynamic reading device category. In the second category of image reading systems, the image reading device or image reading head is driven to move in parallel, or namely in a line-by-line scanning way, in front of the stationary objects which are scanned during the image reading process. The scanning operation is completed by moving the image reading device or image reading head through the whole reading area, such as an original sheet or an object being scanned. The design is generally employed in high-quality scanning systems like typical flat-bed scanning systems, in order to provide raised image quality by the stability in the scanning operation.

In either category of the scanning systems, a line or array of image sensors are provided to read the image with the illumination of a light source. In general, the light source of a fluorescent lamp, a single or more light emitting diodes (LED), or other light emitting device is employed to provide the scanned object with essential illumination and reflect the image on the object to the image sensors.

In the second category of the image scanning systems, or namely the moving reading device image scanning systems, most of the designs are applied for scanning opaque originals. Referring to FIG. 1, for scanning transparent originals 10 such as slides, a backside light source 12 is provided to illuminate the transparent original 10 from the backside. The image reading head 14 is placed in front of the transparent original 10, at the corresponding location of the backside light source 12, in order to read the illuminated image. In a typical flat-bed scanning system, the backside light source 12 is placed in the upper lid and the image reading head 14 is placed under a transparent plate, such as a glass plate, for supporting the originals.

In the illustrated scanning system for scanning transparent originals, both the backside light source 12 and the image reading head 14 are driven to move through the whole original. In the ideal case, the backside light source 12 and the image reading head 14 are aligned exactly in the relative up-down position, and are driven individually but remain in parallel to provide consistent illumination for image reading during the scanning operation.

However, in the real case, the scanner is composed of lots of complicated moving parts. Most of the composing parts, under the mass-production, has some dimension deviation from the designed model. In the fabrication of combining parts, the combination process will also has some unavoidable deviations. The accumulated errors or deviations of parts, fabrication, and even scanning operation might result in the inaccuracy in the alignment of the backside light source 12 and the image reading head 14, or the non-parallel position of the backside light source 12 or the image reading head 14. The mis-alignment in the image-reading or illumination parts causes the problems like image distortion, dark and illuminated regions, and damages the quality of image reading.

In addition, since the backside light source 12 and the image reading head 14 must be driven synchronously during the scanning, some problems may arise from the driving of the backside light source 12 and the image reading head 14. However, the design of conventional scanning systems lacks a systematic approach to determine or measure the alignment between the two devices. The mis-alignment generally causes the non-uniformity in the light-intensity distribution and results in the non-uniformity in the brightness of the scanned image. The severeness of the mis-alignment can only be judged by the scanned image, and the exact relative position or the deviation tolerance of the two devices can hardly be investigated. Namely, no exact data can be granted for design for manufacturing improvements.

SUMMARY OF THE INVENTION

The present invention proposes a method for detecting the relative location of an image reading head and a light source, and the method is especially designed for the application in a scanning system for transparent originals. The relative location between an image reading head and a backside light source for illuminating a transparent original can be detected. The design or fabrication error can be measured with accuracy to provide information for improving the quality of image reading and operational characteristics of the scanning system.

The method in the present invention, for detecting the relative location of an image reading head and a light source in an image reading system, includes several steps as follows. At first, the light source is positioned to a first detecting point in a scanning region of the image reading system. The image reading head is moved to pass through the first detecting point while keeping the light source fixed at the first detecting point. At the same time, the scanned images are recorded through the moving process of the image reading head. Finally, the scanned images is processed to provide functional information of the image reading head and the light source.

For acquiring information of the image reading head and the light source at different locations, the same approach can be applied at other points in the scanning region of the image reading system. In the preferred embodiments, a transparent original is placed between the image reading head and the light source in the image reading head moving step and the image recording step.

In the case, the functional information of the image reading head and the light source, such as the oblique of the image reading head, the oblique of the light source, the deviation in aligning the two devices, the usable image reading range of the image reading head, the distance of an aligning point from the boundary of the usable image reading range, the magnifying ratio, the lateral deviation of the image reading head, and the lateral deviation of the light source, can be generated from processing the scanned images.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein:

FIG. 1 is an illustrative side view of major elements in a scanning system for scanning transparent originals in the prior art;

FIG. 2 is an illustrative side view of major elements in a scanning system for performing the detection method in accordance with the present invention;

DETAILED DESCRIPTION OF THE PREFERRED EMBODIMENT

The present invention proposes a method for detecting the relative location between an image reading head and a light source. In the method which is especially designed for the application in a scanning system for transparent originals, the relative location between an image reading head and a backside light source for illuminating a transparent original can be detected at one or more positions. A detailed information about design or fabrication errors can be compared and computed from the approach proposed in the preferred embodiments. The design and fabrication process can be greatly improved with the information, which also results in the raised quality of image reading and improved operational characteristics of the scanning system.

Referring to FIG. 2, an illustrative side view of major elements in a scanning system for performing the detection method in the present invention is shown. As an example, a flat-bed scanning system is described in the case for a focused and clear illustration of the method in the preferred embodiments.

Typically, the flat-bed scanning system, especially the one for scanning transparent originals, belongs to the so-called moving reading device category, as illustrated in the background of the invention. The major devices employed in the detection may includes an image reading head 20, a light source 22, and preferably a transparent original 24.

In general, the light source 22 is a fluorescent lamp tube to provide a long illumination region through the transparent original 24, on the region where the scanning line of the image reading device 20 is located. In a A4 size flat-bed scanner, a fluorescent lamp tube having a length over 210 millimeters can be used. The light source 22 in the case is placed in the upper lid of the flat-bed scanning system, and is driven by motors and related controlling circuits.

The image reading device 20 is mostly composed of charge-coupled devices (CCDs) with accompanying reflecting mirrors, focus lens, filters, or color-splitting prisms, and the whole device is driven by motors and related control circuits to move under a glass or transparent plate for supporting originals. For reading color images, the charge-coupled devices can be arranged in an array of at least three rows to read the image of separated colors, such as red, green and blue (RGB). Alternatively, the image reading head 20 may also be a contact image sensor (CIS) module having embedded light source, image sensors, and controlling circuits. Having the improving operational characteristics of CMOS (complementary metal-oxide semiconductor) photo sensor devices, CMOS devices can also employed to replace the charge-coupled devices.

Figure 3:
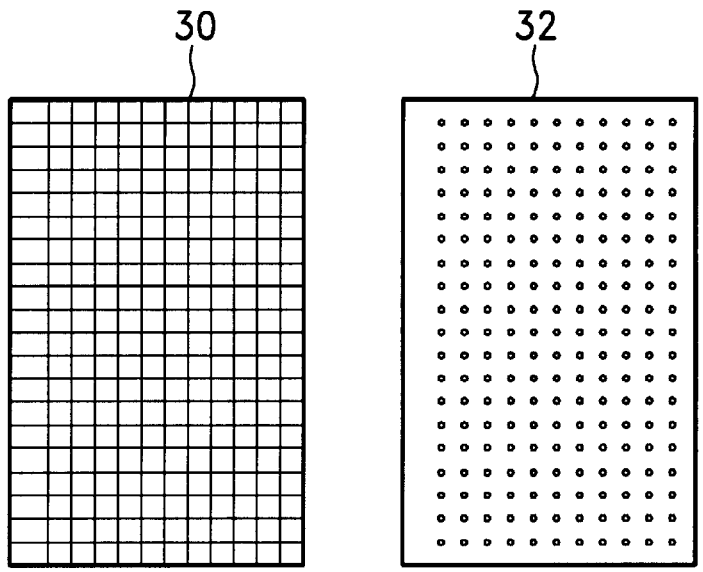
FIG. 3 illustrates two examples of the pattern on the transparent original in accordance with the present invention.

For performing some detection of basic qualitative characteristics in the alignment between the image reading head 20 and the light source 22, the transparent original 24 may not be necessary. However, in the preferred embodiments of performing a detailed detection between the image reading head 20 and the light source 22 to provide quantified information, the transparent original 24 is useful. In the preferred embodiments, the transparent original 24 is provided with a regularly distributed pattern thereon, such as a rectangular array pattern 30 or grid pattern 32 as shown in FIG. 3.

Figure 4:
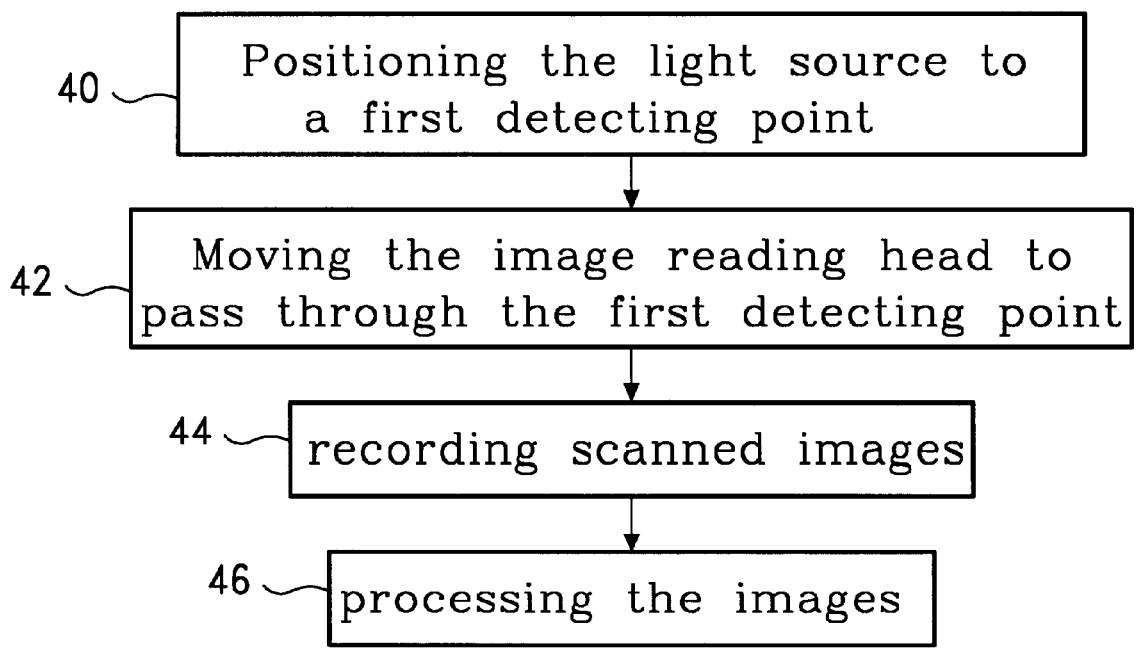
FIG. 4 illustrates a schematic flow diagram of the detecting method in accordance with the present invention.

Turning to FIG. 4, a schematic flow diagram of the detecting method in accordance with the present invention is shown. Before the performing of the detection step, the image reading head 20 and the light source 22 as shown in FIG. 2 are placed at a starting position, like the zero (0) point indicated in the figure, or at any point before the scanning region of originals. The first step 40 in FIG. 4 is performed to position the light source 22 to a first detecting point 22a, in a scanning region of the image reading system, as shown in FIG. 2. The first detecting point 22a can be located at any location in the scanning region, especially the crucial point for acquiring detailed information about the position and alignment condition of the image reading head 20 and the light source 22. As an example, three, five, ten, or even twenty detecting points can be assigned in the detection procedure under different needs for acquiring detailed information.

In the step 42 of FIG. 4, the image reading head 20 is moved to pass through the first detecting point, or namely the corresponding point of 20a. At the same time, the light source 22 is kept fixed at the first detecting point 22a. Another step 44 is carried out synchronously to record the scanned images through the entire moving step 42 of moving the image reading head 20. By fixing the light source 22 and moving the image reading head 20 to scan the different image at different locations, the characteristics of scanned image at different relative locations between the light source 22 and the image reading head 20 can be acquired for later processing.

The range of moving the image reading head 20 before and after the first detecting point can be determined from a lot of factors, such as the width of opening in the image reading head 20, the resolution of the scanning system, and the information needed from the detection step. In the case, the moving range of the image reading head 20 is between about −35 to 35 millimeters before or after the first detecting point. For a scanning system having a resolution of about 600 dots per inch (DPI), the moving range is equal to about −827 to 827 pixel units from the detecting point.

Figure 5:
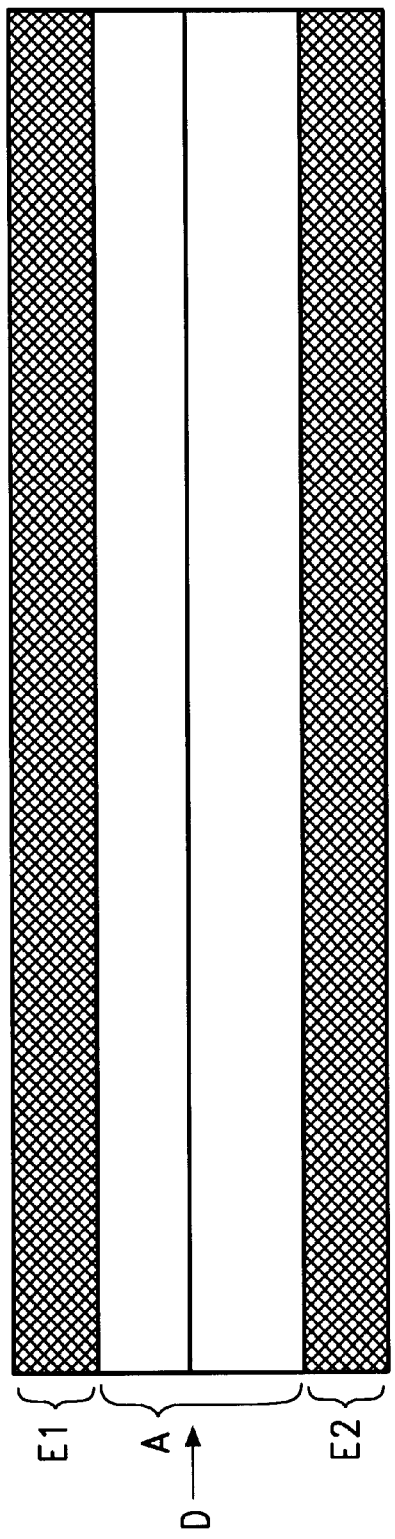
FIG. 5 illustrates the scanned images by the image reading head without using a transparent and patterned original in accordance with the present invention;.

An example of the recorded image by the image reading head 20, in the case without using a patterned transparent plate, is illustrated in FIG. 5. Since the width of opening in the image reading head 20 is limited, the scanned images have dark regions, such as E1 and E2, which are located beyond the visible range or angle of the image reading head 20. In contrast to the invisible dark regions E1 and E2, the visible region A is where the image can be scanned. A theoretical or ideal aligning point D should be located at where the intensity and uniformity of the distributed light is at the optimized state.

In the step 44 of FIG. 4, the scanned images are then processed to provide functional information of the image reading head and the light source. The processing task can be performed by a processing unit coupled with the image scanning system, like a computer or other units with the processing ability of analyzing the scanned image through comparison and computation. In the processing step, the information on the intensity and uniformity of the illumination from the light source 22 at different relative locations between the light source 22 and the image reading head 20 can be acquired.

For acquiring more detailed functional characteristics about the light source 22 and the image reading head 20, a transparent original 24 having a pattern thereon can be placed between the image reading head 20 and the light source 22, as indicated in FIG. 2. As described above, the transparent original 24 in the preferred embodiments is provided with a regularly distributed pattern thereon, such as a rectangular array pattern 30 or grid pattern 32 as shown in FIG. 3.

Figure 6:
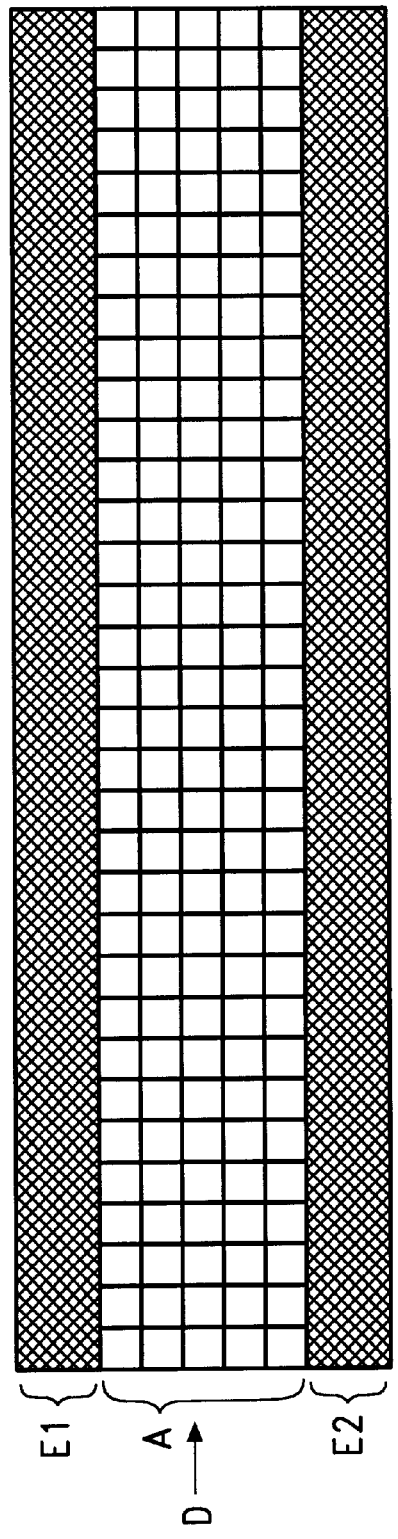
FIG. 6 illustrates the ideal scanned images by the image reading head of employing a transparent original with a rectangular array pattern in accordance with the present invention.

In the case of employing a transparent original 24 having a rectangular array pattern thereon, an ideal case of the scanned images is shown in FIG. 6. The same dark regions E1 and E2 are presented on the top and bottom of the images. reading head moving step and the image recording step. In the ideal case, the rectangular array pattern 30 on the transparent original 24 should be read with accuracy without any distortion.

Figure 7:
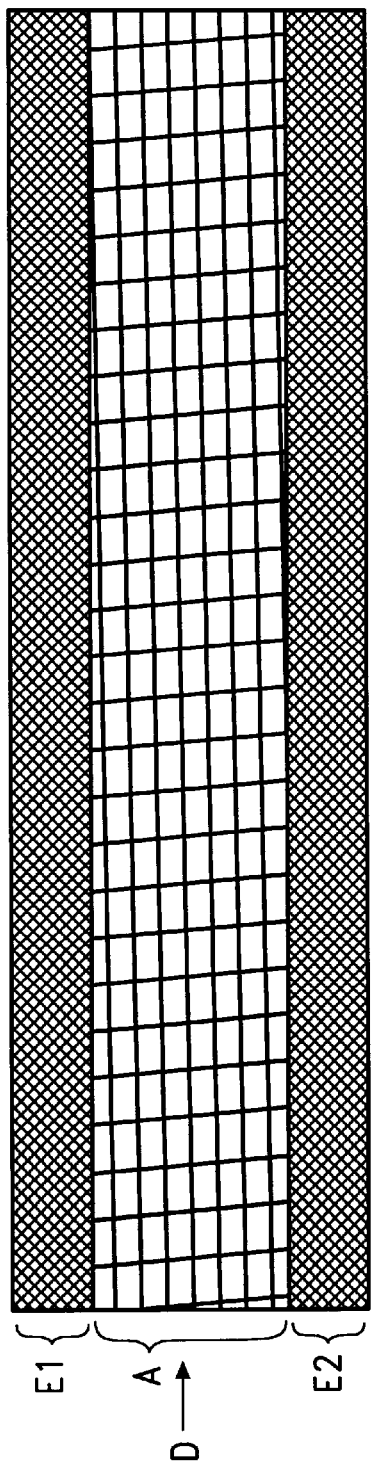
FIG. 7 illustrates an example of the scanned images by the image reading head in accordance with the present invention.
Figure 8:
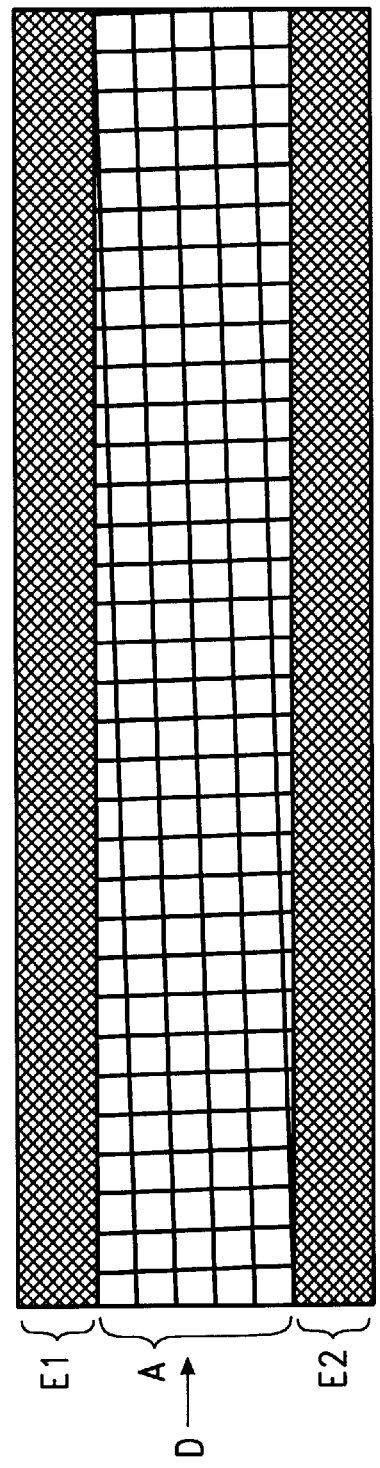
FIG. 8 illustrates another example of the scanned images by the image reading head in accordance with the present invention.

However, in the real case, the scanned images may have distortion, position shift, and the change of magnifying ratio, such as the example given in FIG. 7. A great amount of problems at the early-stage design or manufacturing problems may results severe image distortion in the scanned images. From the scanned images, various parameters, such as the magnifying ratio in each direction, the inclination of horizontal lines, the pattern shift in each direction, the distribution in light intensity, and etc., can be respectively measured and quantified from the scanned image. FIG. 8 is another example of scanned images which most of the design problem about the image scanning system have been corrected and detailed analysis of the pattern can be further employed to optimize the fabrication process or the control method of the light source 22 and the image reading head 20.

Having the data acquired from the scanned images such as the ones in FIG. 7 and FIG. 8, the functional information of the image reading head 20 and the light source 22 can be achieved by analyzing the data and the image pattern. In the case, the information such as the oblique of the image reading head 20, the oblique of the light source 22, the deviation in aligning the two devices 20 and 22, the usable image reading range of the image reading head 20, the distance of an aligning point (of the two devices 20 and 22) from the boundary of the usable image reading range, the magnifying ratio, the lateral deviation of the image reading head, and the lateral deviation of the light source, can be generated. The detailed approach of generating the information from the analysis of the image provided is known by skilled artisans and is not illustrated in detail.

After the detailed information about the first detecting point is acquired, the same process can be carried out at a second detecting point, like the points 20b and 22b in FIG. 2. In the same way, a step for positioning the light source to a second detecting point in the scanning region of the image reading system, is performed. Next, the same series of steps including image reading head moving step, the image recording step, and the image comparing step are performed in according to the second detecting point to provide functional information of the image reading head and the light source in relative to the second detecting point.

Alternatively, the aforementioned approach can be performed in another way by fixing the image reading head 20 in a fixed point and moving the light source 22. Simply saying, the steps includes: positioning the image reading head 20 to a first detecting point in a scanning region of the image reading system; moving the light source 22 to pass through the first detecting point while keeping the image reading head 20 fixed at the first detecting point; recording scanned images by the image reading head 20 through the moving process of the light source 22; and processing the scanned images to provide functional information of the light source 22 and the image reading head 20. The same procedure can be applied to other detecting points to get the information at different points. Therefore, the similar detailed can be acquired as illustrated above.

As is understood by a person skilled in the art, the foregoing descriptions of the preferred embodiment of the present invention is an illustration of the present invention rather than a limitation thereon. It is intended to cover various modifications and similar arrangements included within the spirit and scope of the appended claims. The scope of the claims should be accorded to the broadest interpretation so as to encompass all such modifications and similar structures. While the preferred embodiment of the invention has been illustrated and described, it will be appreciated that various changes can be made therein without departing from the spirit and scope of the invention.

What is claimed is:

1. A method for detecting the relative location of an image reading head and a light source in an image reading system, said detecting method comprising the steps of:

placing a transparent original between the image reading head and the light source, the transparent original having a regular pattern thereon;

positioning the light source to a first detecting point in a scanning region of the image reading system;

moving the image reading head to pass through said first detecting point while keeping the light source fixed at said first detecting point;

recording scanned images through said moving process of the image reading head; and processing said scanned images to provide functional information of the image reading head and the light source.

2. The detecting method of claim 1 further comprises the steps of:

positioning the light source to a second detecting point in the scanning region of the image reading system; and performing said image reading head moving step, said image recording step, and said image comparing step in according to said second detecting point to provide functional information of the image reading head and the light source in relative to said second detecting point.

3. The detecting method of claim 1, wherein the regular pattern comprises a grid pattern or a rectangular array pattern.

4. The detecting method of claim 1, wherein said functional information of the image reading head and the light source is selected from the group consisting of an oblique of the image reading head, an oblique of the light source, a deviation in aligning, an usable image reading range of the image reading head, a distance of an aligning point from the boundary of said usable image reading range, magnifying ratio, a lateral deviation of the image reading head, a lateral deviation of the light source, and the combination thereof.

5. The detecting method of claim 1, wherein a moving range of the image reading head is between about −35 to 35 millimeters, respectively before and after said first detecting point and second detecting point.

6. The detecting method of claim 1, wherein said image reading system is a flat-bed image scanning system.

7. A method for detecting the relative location of a light source and an image reading head in an image reading system, said detecting method comprising the steps of:

placing a transparent original between the image reading head and the light source, the transparent original having a regular pattern thereon;

positioning the image reading head to a first detecting point in a scanning region of the image reading system;

moving the light source to pass through said first detecting point while keeping the image reading head fixed at said first detecting point;

recording scanned images by the image reading head through said moving process of the light source; and processing said scanned images to provide functional information of the light source and the image reading head.

8. The detecting method of claim 7 further comprises the steps of:

positioning the image reading head to a second detecting point in the scanning region of the image reading system; and performing said light source moving step, said image recording step, and said image comparing step in according to said second detecting point to provide functional information of the light source and the image reading head in relative to said second detecting point.

9. The detecting method of claim 7, wherein the regular pattern comprises a grid pattern or a rectangular array pattern.

10. The detecting method of claim 7, wherein said functional information of the light source and the image reading head is selected from the group consisting of an oblique of the light source, an oblique of the image reading head, a deviation in aligning, an usable image reading range of the light source, a distance of an aligning point from the boundary of said usable image reading range, magnifying ratio, a lateral deviation of the light source, a lateral deviation of the image reading head, and the combination thereof.

11. The detecting method of claim 7, wherein a moving range of the light source is between about −35 to 35 millimeters, respectively before and after said first detecting point and second detecting point.

12. The detecting method of claim 7, wherein said image reading system is a flat-bed image scanning system.

13. A method for detecting the relative location of an image reading head and a light source in an image reading system, said image reading system being a flat-bed image scanning system, said detecting method comprising the steps of:

placing a transparent original between the image reading head and the light source, said transparent original having a grid or a rectangular array pattern thereon;

positioning the light source to a first detecting point in a scanning region of the image reading system;

moving the image reading head to pass through said first detecting point while keeping the light source fixed at said first detecting point;

recording scanned images through said moving process of the image reading head; and processing said scanned images to provide functional information of the image reading head and the light source.

14. The detecting method of claim 13 further comprises the steps of:

positioning the light source to a second detecting point in a scanning region of the image reading system; and performing said image reading head moving step, said image recording step, and said image comparing step in according to said second detecting point to provide functional information of the image reading head and the light source in relative to said second detecting point.

15. The detecting method of claim 13, wherein said functional information of the image reading head and the light source is selected from the group consisting of an oblique of the image reading head, an oblique of the light source, a deviation in aligning, an usable image reading range of the image reading head, a distance of an aligning point from the boundary of said usable image reading range, magnifying ratio, a lateral deviation of the image reading head, a lateral deviation of the light source, and the combination thereof.

16. The detecting method of claim 13, wherein a moving range of the image reading head is between about −35 to 35 millimeters, respectively before and after said first detecting point and second detecting point.

* * * * *